United States Patent [19]

Nourrcier

[11] Patent Number: 5,278,567
[45] Date of Patent: Jan. 11, 1994

[54] POST DETECTION INTEGRATION METHOD AND APPARATUS FOR PULSE COMPRESSION RADAR UTILIZING SURFACE ACOUSTIC WAVE (SAW) MATCHED FILTERS

[75] Inventor: Charles E. Nourrcier, Lakewood, Calif.

[73] Assignee: Hughes Aircraft Company, Los Angeles, Calif.

[21] Appl. No.: 797,607

[22] Filed: Nov. 25, 1991

[51] Int. Cl.⁵ ............................................. G01S 7/292
[52] U.S. Cl. .................................... 342/202; 342/201; 342/203
[58] Field of Search ............... 342/202, 195, 194, 192, 342/189, 203, 201

[56] References Cited

U.S. PATENT DOCUMENTS

| | | | |
|---|---|---|---|
| 4,743,910 | 5/1988 | Hill et al. ............................. | 342/159 |
| 4,783,632 | 11/1988 | Crookshanks .................... | 342/201 X |
| 4,813,006 | 3/1989 | Burns et al. ....................... | 342/189 X |
| 4,833,479 | 5/1989 | Carlson .............................. | 342/194 |
| 4,849,760 | 7/1989 | Solie .................................. | 342/104 |
| 4,860,017 | 8/1989 | Grudkowski ...................... | 342/201 |
| 4,894,660 | 1/1990 | Thomson et al. ................. | 342/129 |
| 4,937,580 | 6/1990 | Wills ................................... | 342/22 |
| 4,952,939 | 8/1990 | Seed .................................... | 342/27 |
| 4,952,940 | 8/1990 | Kuepfer ............................. | 342/174 |
| 4,960,329 | 10/1990 | Schofield ......................... | 342/111 X |

Primary Examiner—John B. Sotomayor
Attorney, Agent, or Firm—Michael W. Sales; Wanda K. Denson-Low

[57] ABSTRACT

Received expanded radar pulses pass through a surface acoustic wave (SAW) weighted filter (64) for sidelobe suppression, and then into a SAW tapped delay line (66). The pulses appear at the taps (66a,66b,66c) of the delay line (66) coarsely aligned in time, pass through individual SAW matched filters (68,84,86,88) for compression and envelope detectors (70,90,92,94) for demodulation, and then into a summer (74) for post detection integration. Individual frequency shifters (78,80,82) are provided between the delay line taps (66a,66b,66c) and the matched filters (84,86,88) for shifting the center frequencies of the pulses and thereby the propagation delays through the matched filters (84,86,88) to provide fine alignment of the pulses in time. The delays through the individual delay line taps (66a,66b,66c) and the frequency shifts of the frequency shifters (78,80,82) are adjustable "on the fly" to compensate for variation of pulse repetition rate (PRF) and interpulse jitter.

13 Claims, 8 Drawing Sheets

POST DETECTION INTEGRATION METHOD AND APPARATUS FOR PULSE COMPRESSION RADAR UTILIZING SURFACE ACOUSTIC WAVE (SAW) MATCHED FILTERS

BACKGROUND OF THE INVENTION

1. Field of the Invention

The present invention generally relates to the field of pulse compression radar, and more specifically to a method and apparatus for integrating a plurality of compressed pulses which automatically compensates for variation of pulse repetition rate and interpulse jitter.

2. Description of the Related Art

Pulse compression is used advantageously in radar systems, including laser radar or "lidar" systems which operate at optical rather than radio frequencies. Pulse compression involves the transmission of a long coded pulse and the processing of the received echo to obtain a relatively narrow pulse. The increased detection capability of a long-pulse radar system is achieved while retaining the range resolution capability of a narrow-pulse system. Transmission of long pulses permits a more efficient use of the average power capability of the radar without generating high peak power signals. The average power of the radar may be increased without increasing the pulse repetition frequency (PRF) and thereby decreasing the unambiguous range of the radar.

In pulse compression radar, a long pulse is generated from a narrow pulse which contains a large number of frequency components with a precise phase relationship between them. The relative phases are changed by a phase-distorting filter such that the frequency components combine to produce a stretched, or expanded pulse which is then amplified and transmitted. In some classes of radar where the transmitted signal frequency is much greater than practical phase-distorting filters such as surface acoustic wave (SAW) devices can accommodate, the transmitter must be frequency modulated directly in order to produce an expanded pulse. This is the case for laser radar. The received echo is processed in the receiver by a compression filter, which readjusts the relative phases of the frequency components so that a narrow or compressed pulse is again produced.

Various pulse compression methods are known in the art, including linear frequency modulation (FM), non-linear FM and phase-coding. Linear FM pulse compression, also known as "chirp", is especially advantageous in that in addition to determining the range to a target, the relative doppler can be obtained simultaneously with resolution equivalent to that of long-pulse radar system.

Linear FM pulse compression is illustrated in FIG. 1. The transmitted pulses have a center carrier frequency $F_C$. The frequency of the carrier is varied through a range $\Delta f$ which is centered about $F_C$ over a duration or pulse width $\Delta t$ of the pulses. The modulation or "chirp" slope of the pulses is therefore $\Delta f / \Delta t$. The time period between successive pulses is equal to 1/PRF and designated as $\Delta T$.

SAW devices are widely used as matched filters for pulse compression. Such a device includes an input transducer and an output transducer mounted on a piezoelectric acoustic substrate. The transducers are usually fabricated as interdigital structures by metal film deposition on the surface of the acoustic medium. The interdigital structures include fingers that dictate the frequency characteristic of the unit. The geometry of the fingers may also be designed to provide suppression of sidelobes which are generated outside the bandwidth of the expanded pulses.

Pulse compression radar and the use of SAW matched filters for pulse compression are known in the art per se, such as described in Chapter 10 of a textbook entitled "Radar Handbook, Second Edition", edited by M. Skolnik, McGraw-Hill 1990. A lidar system which utilizes a SAW device to perform linear FM pulse compression is disclosed in U.S. Pat. No. 4,666,295, entitled "LINEAR FM CHIRP LASER", issued May 19, 1987 to R. Duvall et al.

Detection of weak target returns can be enhanced using a technique known as "post detection integration", in which several consecutive received pulses are integrated or summed together to produce a composite pulse having an amplitude which is substantially larger than that of the individual pulses. This is accomplished by transmitting a burst of pulses, typically four, and feeding the corresponding received pulses through a SAW tapped delay line which is designed such that the pulses appearing at the taps are aligned with each other in time. The pulses are then compressed, envelope detected and summed together to provide a composite integrated pulse for subsequent processing.

A conventional radar system utilizing pulse compression and post detection integration is illustrated in FIG. 2 and generally designated as 10. A frequency modulator 12 modulates short pulses produced by a pulse generator 14 to produce long expanded pulses by, for example, linear FM modulation. The expanded pulses are fed through a transmitter 16 to an antenna 18 which radiates the expanded pulses toward a target (not shown) for detection. Received pulses which are reflected from the target are picked up by the antenna 18 and fed through the transmitter 16 to a mixer 20 in which the pulses are mixed with a signal from a local oscillator 22. The resulting signals are converted to an intermediate frequency (IF) and fed through a backscatter filter 24 to a SAW matched filter 26.

The filter 26 compresses the received pulses and feeds them to a post integration unit 28. The filter 26 is also provided with a weighting function which suppresses time sidelobes of the received pulses. The time sidelobes generated by compressing an expanded pulse with a compression SAW are analogous with the time sidelobes associated with computing a discrete Fourier transform with finite time series signals. The time sidelobes are typically reduced in amplitude from −13dBc to −40 dBc.

The pulses are transmitted in bursts which typically consist of many pulses. However, in this particular example we will consider the bursts to consist of four pulses transmitted at a PRF of $1/\Delta$. The post detection integration unit 28 includes a SAW tapped delay line 30 which includes delay elements 30a, 30b and 30c. The compressed pulses from the matched filter 26 are fed into the unit 28 and split into first to fourth channels CH0 to CH3. The first channel CH0 includes an envelope detector 32 which demodulates the compressed pulses applied directly thereto from the matched filter 26, designated as first compressed pulses, to produce first demodulated pulses which are fed through a low pass filter to a summer or integrator 36.

The delay elements 30a, 30b and 30c each delay the compressed pulses propagating therethrough by a time period equal to $\Delta T$. The second channel includes an envelope detector 38 and low pass filter which receive second compressed pulses from a tap between the delay elements 30a and 30b and produce second demodulated pulses which are applied to the integrator 36. The second compressed pulses and second demodulated pulses are delayed by a time period $\Delta T$ relative to the first compressed and demodulated pulses. The third and fourth channels CH2 and CH3 include envelope detectors 42 and 46 and low pass filters 44 and 48 respectively which are the same as those in the first and second channels CH0 and CH1. The third channel CH2 receives third compressed pulses from the tap between the delay elements 30b and 30c which are delayed by $2\Delta T$, whereas the fourth channel CH3 receives fourth compressed pulses from the output of the delay element 30c which is delayed by $3\Delta T$.

As illustrated in FIG. 2, the four pulses of the burst are designated as A, B, C and D respectively, and are summed by the integrator 36 at a time indicated as 50 at which the fourth pulse D emerges from the low pass filter 34 in the first channel CH0. Due to the delay of $\Delta T$ through the delay element 30a, the third pulse C emerges from the low pass filter 40 in the second channel CH1 at the time 50. Similarly, due to the delay of $2\Delta T$, the second pulse B in the third channel CH2 emerges from the low pass filter 44 at the time 50. The first pulse A emerges from the low pass filter 48 in the fourth channel CH3 at the time 50 due to the delay of $3\Delta T$. As a result, the four pulses A, B, C and D of the burst are summed together or integrated by the integrator 36 to produce an integrated or composite pulse E having an amplitude which is substantially larger than that of the pulses A, B, C and D.

Although effective, the radar system 10 is only capable of operating at a single PRF. If the PRF were changed from $\Delta T$, the pulses A, B, C and D would no longer be aligned in time at the integrator 36 since the time period $\Delta T$ would change although the propagation delay through the delay line 30 would remain constant. In addition, the time period $\Delta T$ between pulses varies to a significant extent in actual radar equipment due to jitter caused by electronic noise and other factors. Such jitter also causes the pulses to be misaligned, resulting in reduced amplitude of the integrated pulse E and decreased range resolution.

SUMMARY OF THE INVENTION

In a post detection integration method and apparatus embodying the present invention, received expanded radar pulses pass through a surface acoustic wave (SAW) weighted filter for sidelobe suppression, and then into a SAW tapped delay line. The pulses appear at the taps of the delay line coarsely aligned in time, pass through individual SAW matched filters for compression and envelope detectors for demodulation, and then into a summer for post detection integration.

Individual frequency shifters are provided between the delay line taps and the matched filters for shifting the center frequencies of the pulses and thereby the propagation delays through the matched filters to provide fine alignment of the pulses in time. The delays through the individual delay line taps and the frequency shifts of the frequency shifters are adjustable "on the fly" to compensate for variation of pulse repetition rate (PRF) and interpulse jitter. The time period between successive pulses is measured by a timer unit including a constant fraction discriminator for precise sensing of the arrival times of the pulses, and the delay times of the delay line and the frequency shifts are adjusted accordingly on a pulse by pulse basis.

Sidelobe suppression is essential in a practical pulse compression radar system. Since the center frequency of the received pulses is constant, the weighting filter which provides sidelobe suppression is located at the upstream end of the apparatus and has a passband corresponding to the bandwidth of the expanded pulses.

The center frequencies of the pulses propagating through the matched filters for compression varies in accordance with the required delay. For this reason, the matched filters cannot provide weighting, and are designed with a bandwidth which is larger than that of the weighting filter by the maximum amount by which the center frequencies of the pulses emerging from the delay line taps may be shifted by the frequency shifters.

These and other features and advantages of the present invention will be apparent to those skilled in the art from the following detailed description, together with the accompanying drawings, in which like reference numerals refer to like parts.

DETAILED DESCRIPTION OF THE INVENTION

Figure 3:
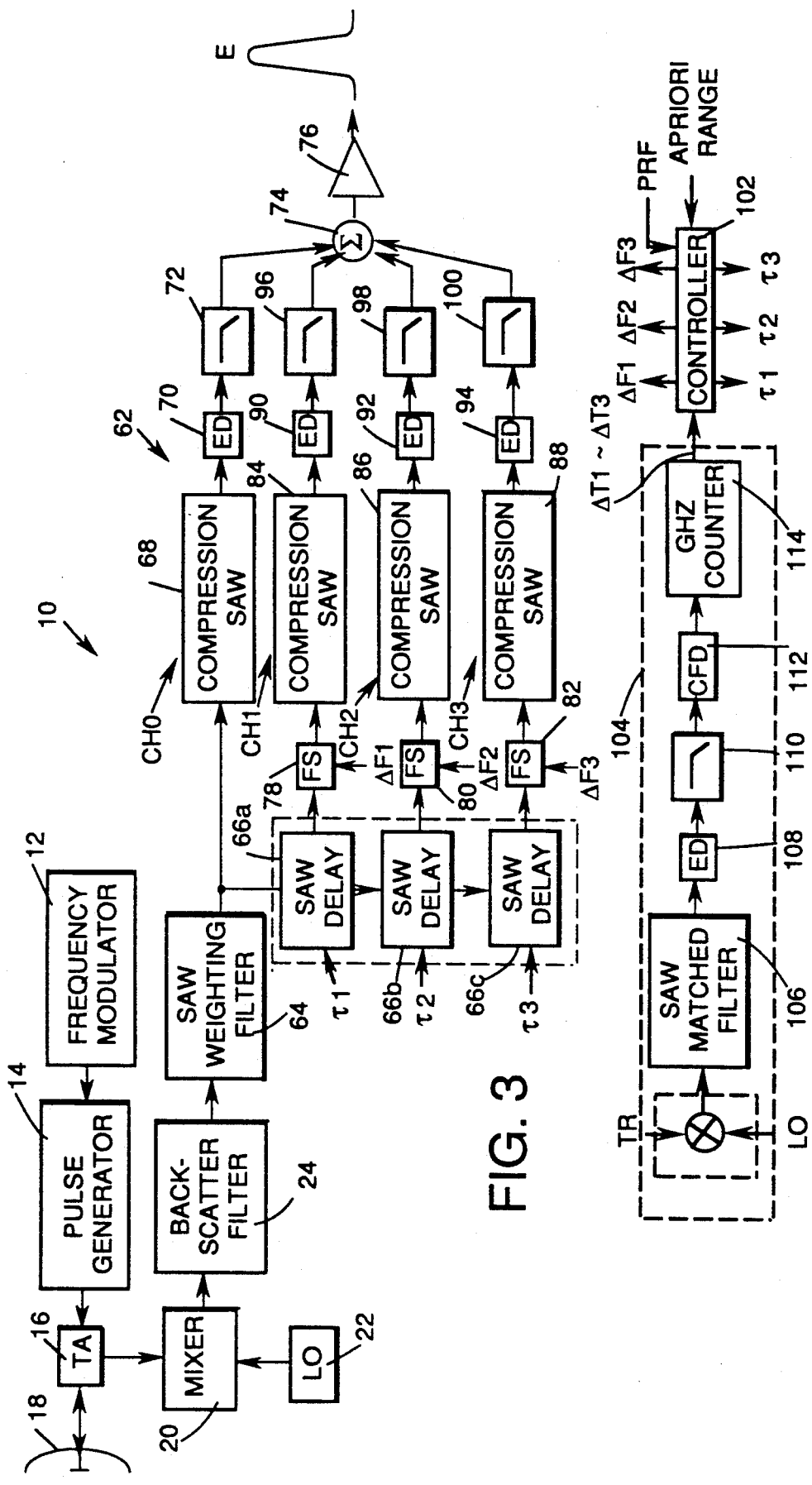
FIG. 3 is a block diagram illustrating a radar system including a post detection integration apparatus embodying the present invention.

A radar system 60 embodying the present invention is illustrated in FIG. 3, and includes elements common to the radar system 10 which are designated by the same reference numerals. The system 60 includes a post integration apparatus or unit 62 including a SAW weighting filter 64 which receives the received expanded radar pulses from the backscatter filter 24. These pulses have a normal center frequency which is substantially equal to the IF frequency of the radar system 60. The weighting filter 64 has a passband which is substantially equal to the bandwidth of the received pulses as converted to the IF frequency. Only a single weighting filter 64 is required since, although the PRF and $\Delta T$ of the pulses may vary, the center frequency will remain constant. The filter 64 therefore provides the function of sidelobe suppression.

The post integration unit 62 is illustrated as including four channels CH0 to CH3 in the same manner as the conventional unit 28 for processing bursts of four pulses. However, it is within the scope of the invention to provide a post integration unit with two, three or more than four channels.

The received pulses from the weighting filter 64 are fed into a SAW tapped delay line 66 which includes delay elements 66a, 66b and 66c, and also directly into channel CH0 which includes a SAW matched compression filter 68, envelope detector 70 and low pass filter 72. The output of the filter 72 is applied to a summer or integrator 74 which produces integrated output pulses E in the same manner as described with reference to FIG. 2. Further illustrated is an amplifier 76 for amplifying the integrated pulses E prior to subsequent processing.

Outputs of the delay line elements 66a, 66b and 66c are applied through frequency shifting units 78, 80 and 82, SAW matched compression filters 84, 86 and 88, envelope detectors 90, 92 and 94 and low pass filters 96, 98 and 100 respectively to the integrator 74.

Figure 2:
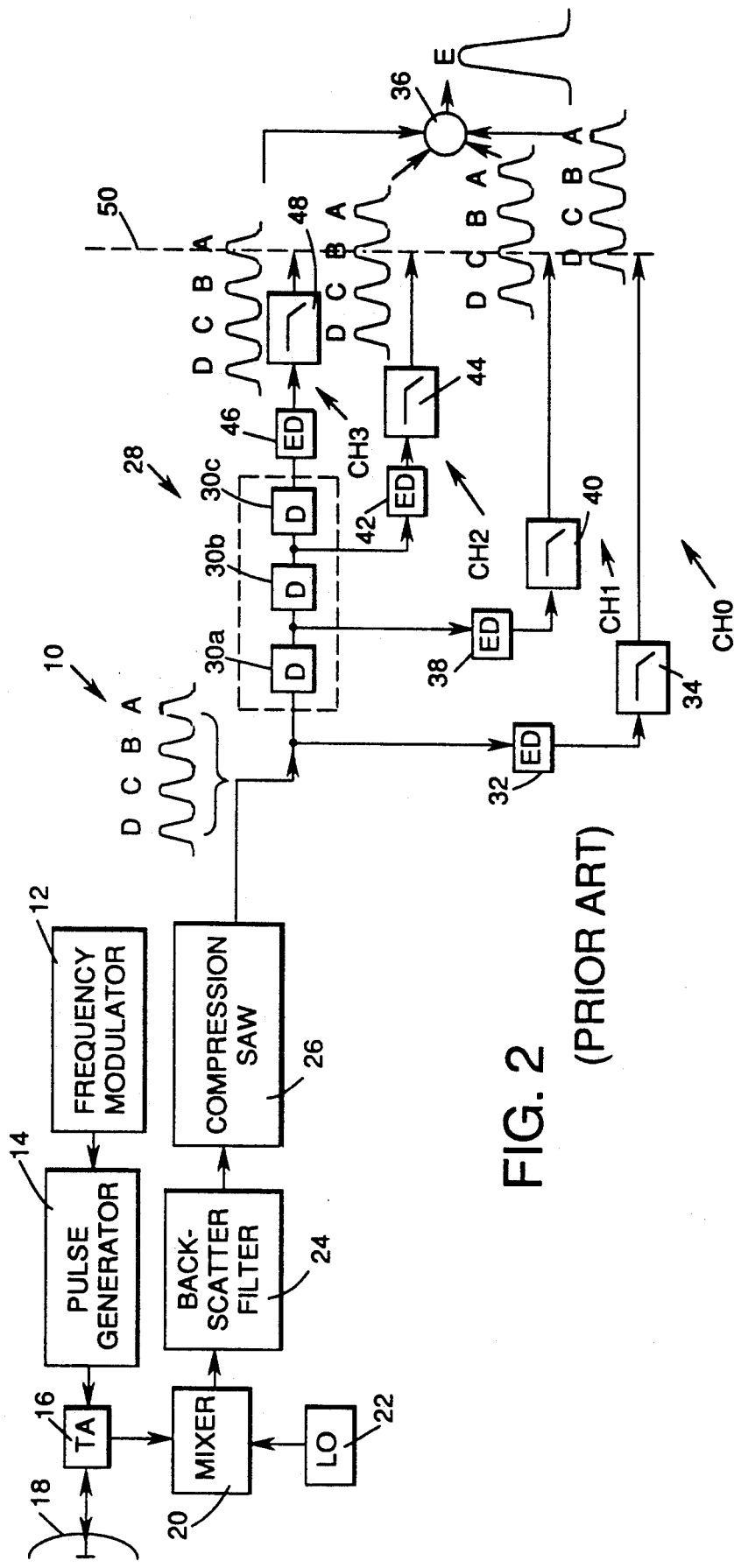
FIG. 2 is a block diagram illustrating a prior art radar system utilizing pulse compression and post detection integration.

Whereas the time delays of the delay elements 30a, 30b and 30c of the conventional tapped delay line 30 illustrated in FIG. 2 are fixed, the time delays of the delay elements 66a, 66b and 66c are variable and designated as $\tau_1$ to $\tau_3$ respectively. In addition, the frequency shifting units 78, 80 and 82 are constructed to shift the center frequencies of the pulses propagating therethrough from the normal center frequency (IF frequency) by variable differential frequencies which are designated as $\Delta F1$ to $\Delta F3$ respectively. The values of $\tau_1$ to $\tau_3$ and $\Delta F1$ to $\Delta F3$ are set by a controller unit 102 in accordance with sensed time periods $\Delta T1$ to $\Delta T3$ between successive received pulses of each four pulse burst as determined by a timer unit 104.

Figure 4:
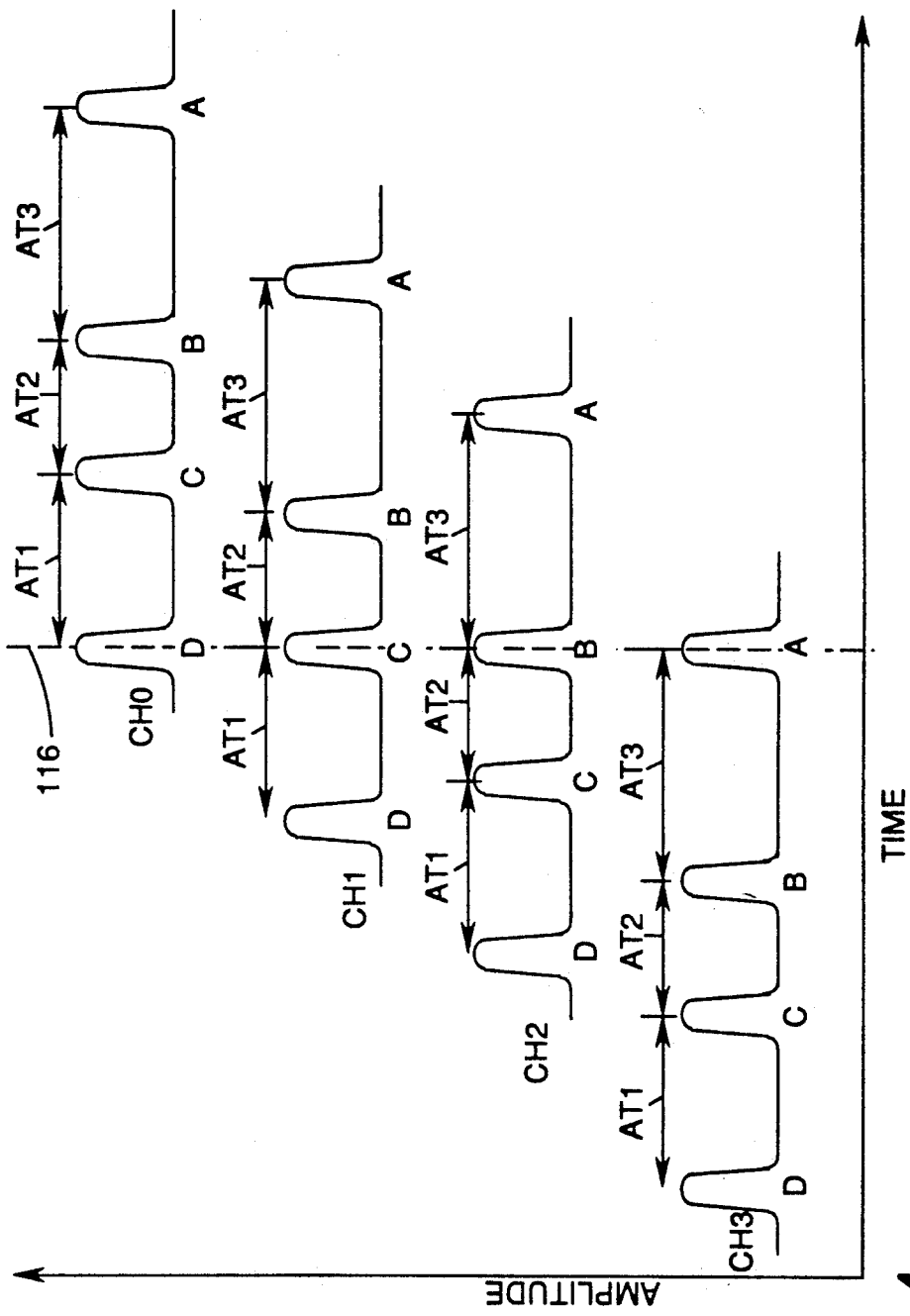
FIG. 4 is a timing diagram illustrating the operation of the invention.

As illustrated in FIG. 4, each burst consists of four pulses A, B, C and D in the same manner as described above with reference to FIG. 2. However, the PRF of the pulses and the time periods $\Delta T1$ to $\Delta T3$ between them are variable in accordance with the present invention. Whereas the PRF will be varied deliberately, the time periods between pulses will vary due to interpulse jitter. The PRF will be changed globally at very long intervals compared to the time periods $\Delta T1$ to $\Delta T3$, and the time periods will vary by larger amounts due to changing of the PRF than due to interpulse jitter.

Figure 1:
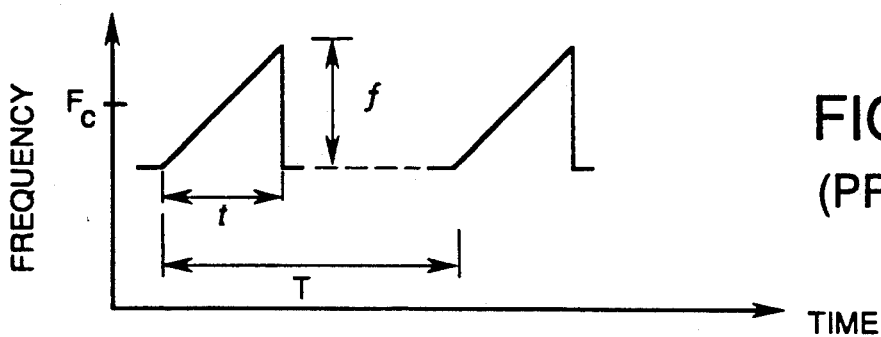
FIG. 1 is a timing diagram illustrating linear FM pulse compression.

The time period $\Delta T3$ is between the pulses C and D, the time period $\Delta T2$ is between the pulses B and C and the time period $\Delta T3$ is between the pulses A and B. The time periods $\Delta T1$ to $\Delta T3$ have a normal value comparable to $\Delta T$ as described with reference to FIG. 1, but are independently variable due to interpulse jitter.

The timer unit 104 receives transmitted expanded pulses TR from the transmitter 16 and local oscillator pulses LO from the local oscillator 22 to produce expanded pulses at the IF frequency corresponding to the pulses A to D. The timer unit 104 includes a SAW matched filter 106, envelope detector 108, low pass filter 110, constant fraction discriminator 112 and pulse counter 114 which measure the time periods $\Delta T1$ to $\Delta T3$. This is possible because the time periods $\Delta T1$ to $\Delta T3$ are the same for the transmitted and received pulses, and the length of time required for the transmitted pulses to be reflected back from a target is very long compared to the time required to measure the time periods $\Delta T1$ to $\Delta T3$ for the transmitted pulses and set up the delay line 66 and frequency shifters 78, 80 and 82 to process the received pulses.

The pulses D, C, B and A propagating through the channels CH0, CH1, CH2 and CH3 are aligned and integrated at a time designated as 116 to produce the integrated output pulse E. In the illustrative example shown in FIG. 4, the time period $\Delta T2$ is shorter than $\Delta T1$, and the time period $\Delta T3$ is longer than $\Delta T1$. The pulse C in the second channel CH2 is aligned in time with the pulse D in the first channel CH0 by delaying the pulse propagation through the second channel CH1 by $\Delta T1$. The pulse B in the third channel CH2 is aligned with the pulse D in the first channel CH0 due to a propagation delay of $\Delta T1 + \Delta T2$. The pulse A in the fourth channel CH3 is aligned with the pulse D in the first channel CH0 due to a propagation delay of $\Delta T1 + \Delta T2 + \Delta T3$.

The controller unit 102 receives, in addition to the time periods $\Delta T1$ to $\Delta T3$ from the timer unit 104, values of the instantaneous PRF and apriori (expected or estimated) range to the target. The apriori range is used for signal gating purposes to increase the detection probability of the radar system 60, and is not the particular subject matter of the invention. The PRF is set to new values at relatively long intervals of time, such as once per second.

Upon setting the new PRF, the controller unit 102 calculates the values for the time delays $\tau_1$ to $\tau_3$ for the delay elements 66a to 66c of the delay line 66 and the time periods $\Delta T1$ to $\Delta T3$ for the frequency shifters 78, 80 and 82 respectively as a function of the PRF alone. In this case, $\Delta T1 = \Delta T2 = \Delta T3$. If the delay elements 66a, 66b and 66c are capable of being set to exactly $\Delta T1 = \Delta T2 = \Delta T3$, then $\tau_1 = \tau_2 = \tau_3 = \Delta T1 = \Delta T2 = \Delta T3$ and $\Delta F1 = \Delta F2 = \Delta F3 = 0$. If the delay elements are not capable of being set to exactly $\Delta T1 = \Delta T2 = \Delta T3$, then the delay times $\tau_1$, $\tau_2$ and $\tau_3$ will be set to values as close as possible to $\Delta T1$, $\Delta T2$ and $\Delta T3$ and the differential frequencies $\Delta F1$, $\Delta F2$ and $\Delta F3$ set to compensate for the differences such that the pulses C, B and A are delayed in the channels by the time periods $\Delta T1$, $\Delta T1 + \Delta T2$ and $\Delta T1 + \Delta T2 + \Delta T3$ respectively.

The SAW matched filters 68, 84, 86 and 88 delay the pulses propagating therethrough by a length of time which varies as a function of the center frequency of the pulses. More specifically, the differential delay time $\Delta \tau$ through each of the matched filters is equal to $\Delta \tau = \Delta F/(\Delta f/\Delta t)$, where $\Delta F$ is the differential frequency, or the amount of frequency shift from the normal center frequency, and $\Delta f/\Delta t$ is the linear FM modulation or chirp slope of the pulses as described above with reference to FIG. 1.

The differential delay time $\Delta \tau$, is the amount by which the propagation delay through the matched filter is changed from the propagation delay at the normal center frequency by the corresponding differential frequency or frequency shift $\Delta F$. The propagation delay through the matched filters at the normal center frequency has a finite value which is the same for all of the channels. In order to simplify the following description, it will be assumed that this constant value is zero. However, it will be understood that in the actual apparatus this constant value exists and is added to the total delays through the respective channels.

The differential frequency $\Delta F$ required to produce a differential delay of $\Delta \tau$ is equal to $\Delta F = \Delta \tau(\Delta f/\Delta t)$. This relationship makes it possible to precisely and continuously vary the propagation delay time through the matched filters by shifting the center frequency of the pulses.

In the illustrated example, there is no delay through first channel CH0, although it is within the scope of the invention to provide such a delay and offset the delays through the channels CH1 to CH3 by a corresponding amount. The delays through the second to fourth channels CH1 to CH3 are : $\tau_1+[\Delta F1/(\Delta f/\Delta t)]$, $\tau_1+\tau_2+[\Delta F2/(\Delta f/\Delta t)]$ and $\tau_1+\tau_2+\tau_3+[\Delta F3/(\Delta f/\Delta t)]$ respectively. The controller unit 102 sets the values of $\tau_1$, $\tau_2$, $\tau_3$, $\Delta F1$, $\Delta F2$ and $\Delta F3$ such that $$\tau_1+[\Delta F1/(\Delta f/\Delta t)]=\Delta T1$$

$$\tau_1+\tau_2+[\Delta F2/(\Delta f/\Delta t)]=\Delta T2$$

$$\tau_1+\tau_2+\tau_3+[\Delta F3/(\Delta f/\Delta t)]=\Delta T3$$

As a numerical example, it will be assumed that the normal center or IF frequency is 500 MHz, the normal PRF is 200 KHz, the modulation slope $\Delta f/\Delta t$ is 20 MHz/$\mu$s and the time periods $\tau_1$, $\tau_2$ and $\tau_3$ of the delay elements 66a, 66b and 66c are capable of being set precisely to corresponding values of $\Delta T1$, $\Delta T2$ and $\Delta T3$ respectively. The normal time periods $\Delta T1$, $\Delta T2$ and $\Delta T3$ at PRF=200 KHz between the successive pulses A, B, C and D with no jitter present is $\Delta T1=\Delta T2=\Delta T3=(1/200\text{ KHz})=5$ $\mu$s. Thus, the time delays $\tau_1$, $\tau_2$ and $\tau_3$ are all set to 5 $\mu$, the delay through the second channel CH1 is 5 $\mu$s, the delay through the third channel is 10 $\mu$s and the delay through the fourth channel CH3 is 15 $\mu$s.

It will now be assumed that the PRF has been changed to 250 KHz such that 1/PRF = 4 $\mu$s. The time delays $\tau_1$, $\tau_2$ and $\tau_3$ are now set to 4 $\mu$s, the delay through the second channel CH1 is 4 $\mu$s, the delay through the third channel is 8 $\mu$s and the delay through the fourth channel CH3 is 12 $\mu$s.

As discussed above, the PRF is changed at relatively long time intervals. Since it is impossible to correct for jitter until it actually occurs, the time delays $\tau_1$, $\tau_2$ and $\tau_3$ to the same value which is equal to 1/PRF. However, the timer unit 104 is able to calculate the actual time periods $\Delta T1$ to $\Delta T3$ between successive pulses to compensate for the effect of jitter on a pulse by pulse basis. The changes in the time periods $\Delta T1$ to $\Delta T3$ caused by jitter is of considerably smaller magnitude than the changes resulting from varying the PRF. For this reason, the frequency shifting units 78, 80 and 82 are designed to provide fine adjustment of propagation delay through the second to fourth channels CH1 to CH3 under control of the units 102 and 104, with the time delays $\tau_1$ to $\tau_3$ being maintained constant at the values to which they were set with the PRF was changed.

As an example of jitter compensation using the frequency shifting units 78, 80 and 82, it will be assumed that the PRF has the normal value of 200 KHz and $\tau_1=\tau_2=\tau_3=5$ $\mu$s, but that due to interpulse jitter $\Delta T1=5$ $\mu$s, $\Delta T2=4.9$ $\mu$s and $\Delta T3=5.2$ $\mu$s.

Since $\tau_1=\Delta T1=5$ $\mu$s, no frequency shift is required for the second channel CH1, and $\Delta F1=0$.

However, since $\Delta T2$ is shorter than the normal value, it is necessary to reduce the total propagation delay through the third channel CH2. The differential frequency $\Delta F2$ is calculated as $$\begin{aligned}\Delta F2 &= (\Delta T1 + \Delta T2 - \tau_1 - \tau_2) \times (\Delta f/\Delta t)\\ &= (5\ \mu s + 4.9\ \mu s - 5\ \mu s - 5\ \mu s) \times (20\text{ MHz}/\mu s)\\ &= (-0.1\ \mu s) \times (20\text{ MHz}/\mu s) = -2\text{ MHz}\end{aligned}$$

Similarly, since $\Delta T3$ is longer than the normal value, it is necessary to increase the total propagation delay through the third channel CH3. The differential frequency $\Delta F3$ is calculated as $$\begin{aligned}\Delta F3 &= (\Delta T1 + \Delta T2 + \Delta T3 - \tau_1 - \tau_2 - \tau_3) \times (\Delta f/\Delta t)\\ &= (5\ \mu s + 4.9\ \mu s + 5.2\ \mu s - 5\ \mu s - 5\ \mu s - 5\ \mu s) \times\\ &\quad (20\text{ MHz}/\mu s)\\ &= (0.1\ \mu s) \times (20\text{ MHz}/\mu s) = +2\text{ MHz}\end{aligned}$$

Although it was assumed in the above description that the time delays $\tau_1$, $\tau_2$ and $\tau_3$ of the delay elements 66a, 66b and 66c could be set exactly to 1/PRF, it is within the scope of the invention to configure the tapped delay line as providing time delays which can be varied in relatively large increments, and configuring the frequency shifting units as providing differential frequencies and corresponding differential time delays which can be varied in smaller increments. In this embodiment of the invention, the delay elements are set to provide coarse time delays which may differ somewhat from the exact value of 1/PRF, and the frequency shifting units are further used to adjust the total time delays through the channels CH1 to CH3 to the exact time periods $\Delta T1$ to $\Delta T3$ respectively. A practical example of this arrangement is illustrated in FIGS. 5 to 10.

In furtherance of the exemplary design parameters presented above, it will be assumed that the PRF is variable between 150 and 250 KHz. The expanded pulse width $\tau_E=4$ $\mu$s and the compressed pulse width $\tau_c=15$ ns. The pulse compression ratio is 4/0.015=267. The minimum increment $\Delta F_{MIN}$ by which the frequency shifting units are required to shift the center frequencies of the pulses propagating through the SAW matched compression filters by varying the differential frequencies $\Delta F1$, $\Delta F2$ and $\Delta F3$ is $$\Delta F_{MIN}=(\tau_c/4)\times(\Delta f/\Delta t) = (0.015\text{ns}/4)\times(20\text{ MHz}/\mu s)=0.075\text{ MHz}=75\text{ KHz}$$

This corresponds to a minimum incremental time delay through the matched filters of 0.075 MHz/(20 MHz/$\mu$s)=3.75 ns.

The minimum increment $\Delta \tau_{MIN}$ by which the delay line elements are required to delay the pulses by the time delays $\tau_1$, $\tau_2$ and $\tau_3$ is selected to be 0.4 $\mu$s. The frequency shifting units are required to shift the center frequencies of the pulses over a corresponding frequency range of $(0.4\ \mu s)\times(20\text{ MHz}/\mu s)=8$ MHz, or 4 MHz above and below the center frequency. The frequency shifting units 78, 80 and 82 therefore provide approximately 107 incremental steps for each one incremental step of the delay line 66.

As discussed above, the SAW weighting filter 64 has a bandwidth which is substantially equally to the bandwidth of the received pulses at the normal center frequency. Assuming a signal bandwidth of 200 MHz and center frequency of 500 MHz, the passband of the weighting filter 64 extends from 400 to 600 MHz. The bandwidth of the SAW matched filters 68, 84, 86 and 88, however, must be larger than the signal bandwidth to accommodate the frequency shift range. Since the center frequencies of the pulses may be shifted within a differential frequency range of 8 MHz (4 MHz above and below the center frequency), the bandwidth of the matched filters must be 208 MHz, with a corresponding passband of 396 to 604 MHz. It will be noted that the passband of the matched filters 84, 86 and 88 may be somewhat larger than this value, since the sidelobes have already been suppressed by the weighting filter 64.

Figure 5:
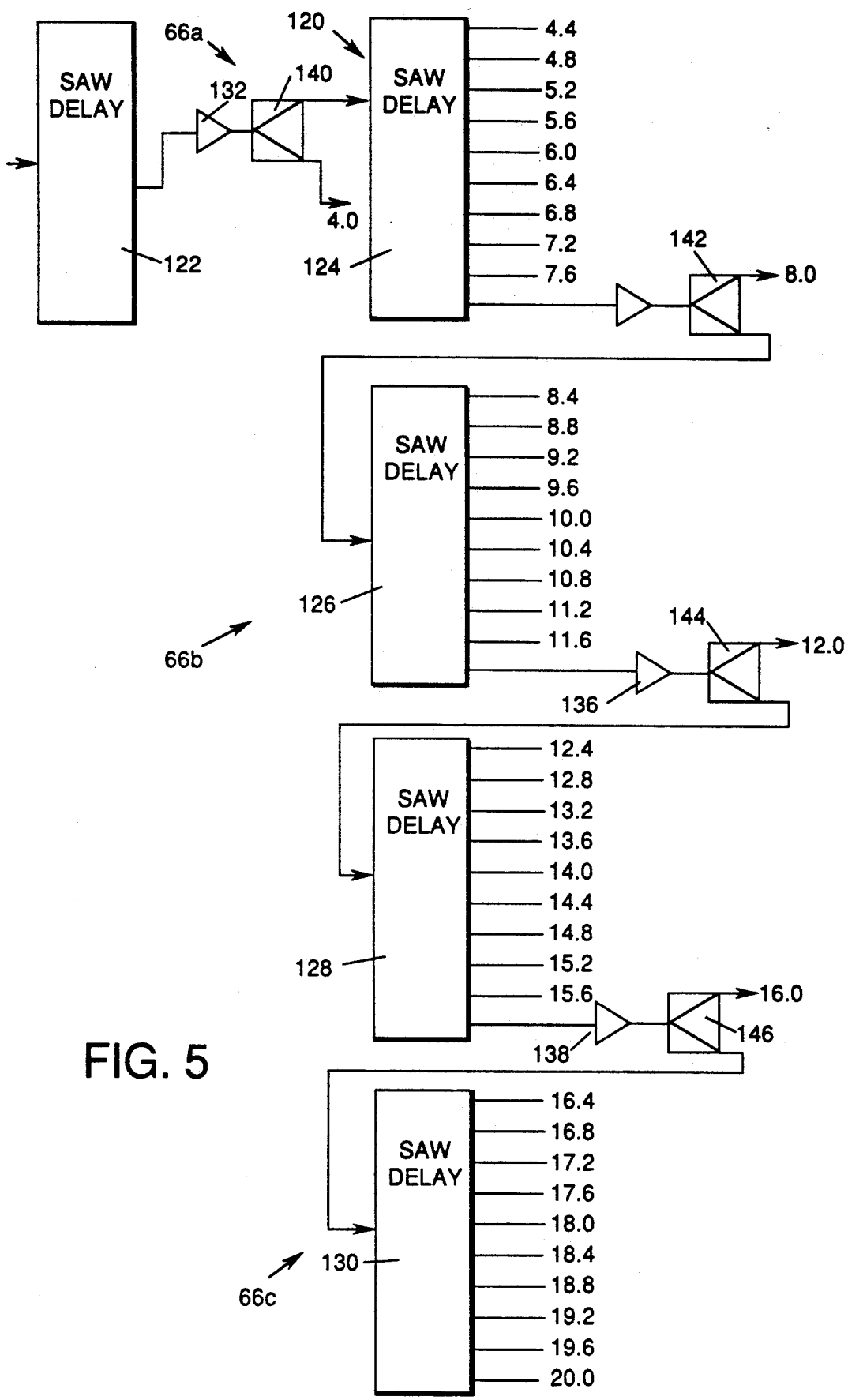

As viewed in FIG. 5, a tapped delay line 120 includes SAW delay elements 122, 124, 126, 128 and 130 which are connected in cascade via buffer amplifiers 132, 134, 136, 138 and hybrids or signal splitters 140, 142, 144 and 146 as illustrated. The delay elements 122 to 130 may each be a model no. LR600-500-20-0.2 delay line manufactured by the PHONON Corp. of Simsbury, CT. Such a delay element has 20 taps which provide delays in increments of 0.2 $\mu$s, from 0.2 to 4.0 $\mu$s. In the present example, only alternate taps of the delay elements are used, providing delays in 10 increments of 0.4 $\mu$s.

As discussed above, the PRF is variable from 150 to 250 KHz, such that 1/PRF, $\Delta T1$, $\Delta T2$, $\Delta T3$, $\tau_1$, $\tau_2$ and $\tau_3$ vary between 4 to 6.67 $\mu$s. Thus, the delay $\Delta T1$ through the first channel CH1 must be variable from 4 to 6.67 $\mu$s, the delay $\Delta T1+\Delta T2$ through the third channel CH2 must be variable from 8 to 13.33 $\mu$s and the delay $\Delta T1+\Delta T2+\Delta T3$ through the fourth channel CH3 must be variable between 12 and 20 $\mu$s.

The entire delay element 122 is used to produce a fixed delay of 4.0 $\mu$s, which cascades to the delay element 124. The element 124 produces delays at its tapped outputs of 4.4 to 8.0 $\mu$s. The output of the delay element 124 is cascaded to the delay element 126, which provides delays at its tapped outputs of 8.4 to 12.0 $\mu$s. In an essentially similar manner, the delay elements 128 and 130 produce delays of 12.4 to 16 $\mu$s and 16.4 to 20.0 $\mu$s respectively.

Figure 6:
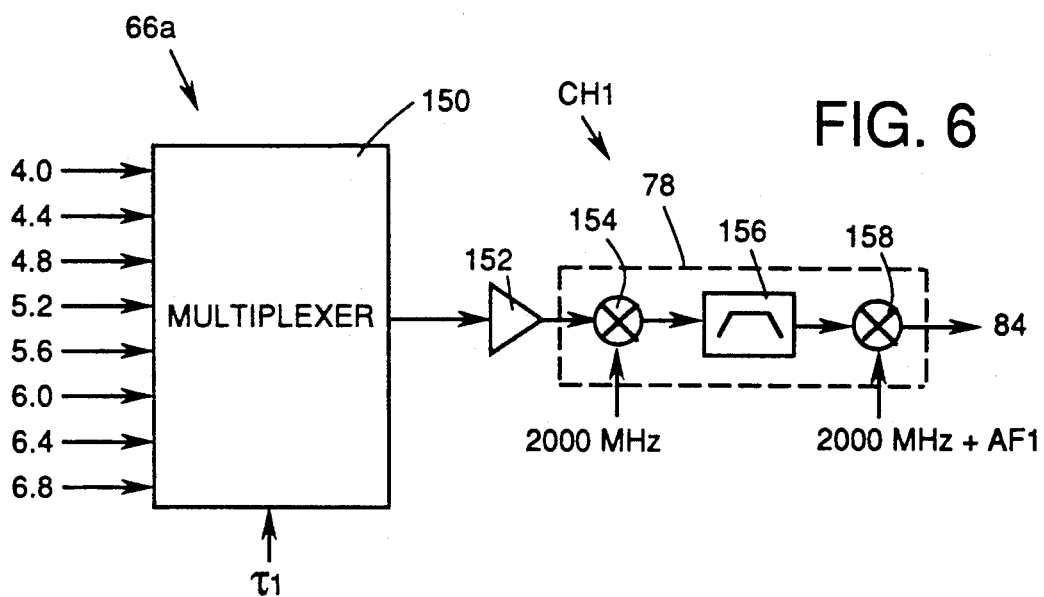
FIGS. 5 to 8 are schematic diagrams illustrating a tapped delay line and frequency shifting units of the invention.

The tapped delay line element 66a includes the delay elements 122 and 124 and, as illustrated in FIG. 6, an eight-input multiplexer 150 which has an input connected to the 4.0 $\mu$s output of the delay element 122 via the splitter 140, inputs connected to the 4.4 to 7.6 $\mu$s outputs of the delay element 124 and an input connected to the 8.0 $\mu$s output of the delay element 124 via the splitter 142. The multiplexer 150 receives a signal designating the required time delay $\tau_1$ from the controller unit 102, and causes the input corresponding to the delay $\tau_1$ to be connected to the output thereof. The output of the multiplexer 150 is connected through an amplifier 152 to the frequency shifting unit 78, which includes a first mixer 154, a bandpass filter 156 and a second mixer 158.

The first mixer 154 mixes the delayed pulses from the multiplexer 150, which have a fixed center frequency of 500 MHz, with a fixed frequency of 2,000 MHz, to produce sum and difference center frequencies at 2,500 MHZ and 1,500 MHz respectively. The bandpass filter 156 passes only the 1,500 MHz difference frequency therethrough. The mixer 158 mixes the output pulses from the bandpass filter 156 with a signal at a frequency of (2,000 MHz + $\Delta$F1) from the controller unit 102 to produce sum and difference center frequencies at (3,500 MHz + $\Delta$F1) and (500 MHz + $\Delta$F1) respectively. The SAW matched filter 84 receives the pulses from the mixer 158, and has a passband which allows only the difference signals (500 MHz + $\Delta$F1) to propagate therethrough. In this manner, the frequency shifter 78 accomplishes its function of shifting the frequency of the pulses propagating through the second channel CH1 from the normal center frequency of 500 MHz to (500 MHz + $\Delta$F1).

Figure 7:
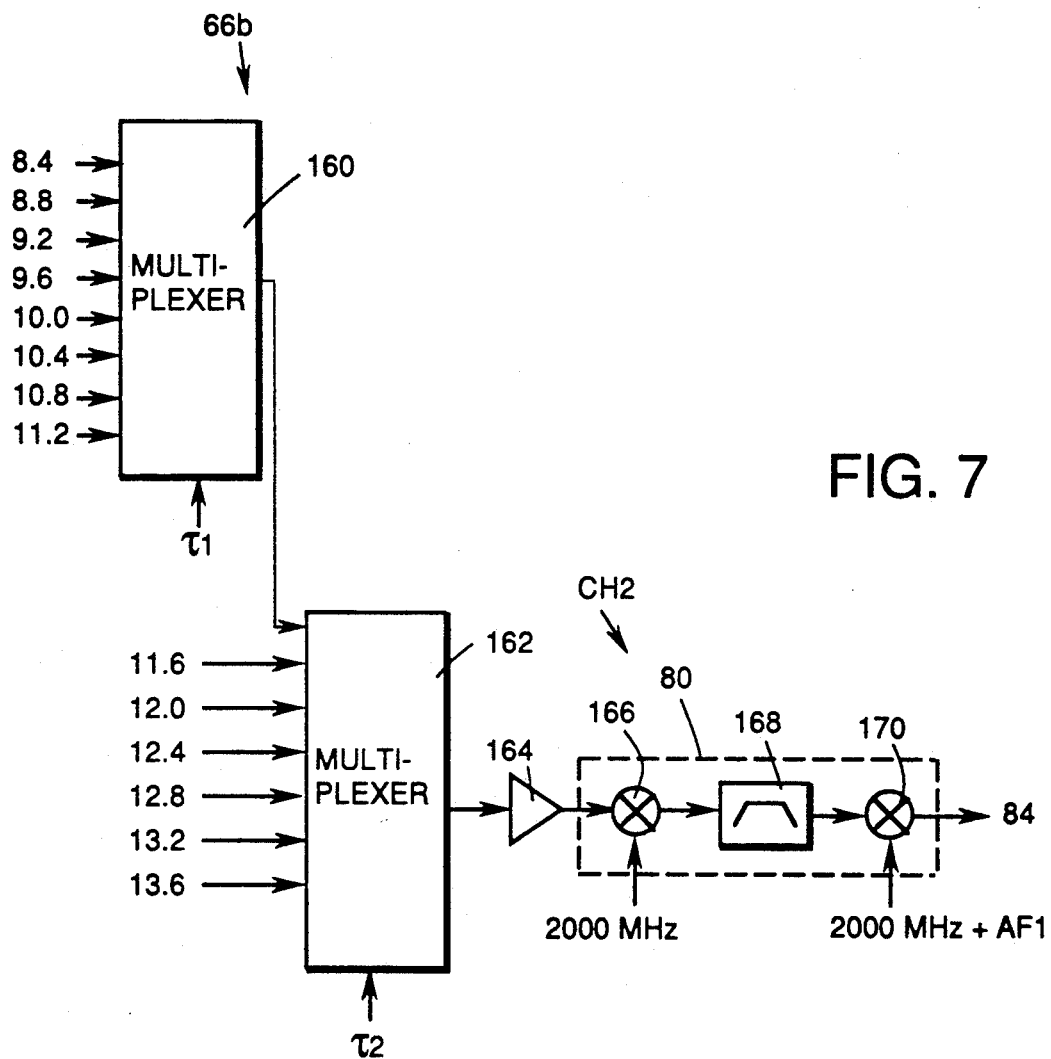

In an essentially similar manner as illustrated in FIG. 7, the delay element 66b includes an eight-input multiplexer 160 which has inputs connected to the 8.4 to 11.2 $\mu$s delay outputs of the delay elements 124 and 126, and an eight-input multiplexer 162 having inputs connected to the 11.6 to 13.6 $\mu$s outputs of the delay elements 126 and 128 as shown. The output of the multiplexer 160 is connected to another input of the multiplexer 162. The value of $\tau_2$ is applied from the controller unit 102 to designate which inputs of the multiplexers are to be connected to the outputs thereof.

The multiplexers 160 and 162 are cascaded since more than eight delay inputs are required. For values of $\tau_2$ between 11.6 and 13.3 $\mu$s, the corresponding inputs of the multiplexer 162 are connected to the output thereof. For values of $\tau_2$ between 8.0 and 11.2 $\mu$s, the input of the multiplexer 162 which is connected to the output of the multiplexer 160 is selected, and the multiplexer 160 is controlled to select the corresponding input.

The output of the multiplexer 162 is connected through an amplifier 164 to the frequency shifting unit 80, which includes a first mixer 166, bandpass filter 168 and second mixer 170 which shift the center frequency of the pulses propagating through the third channel CH2 by $\Delta$F2 in the same manner as described above for the second channel CH1.

Figure 8:
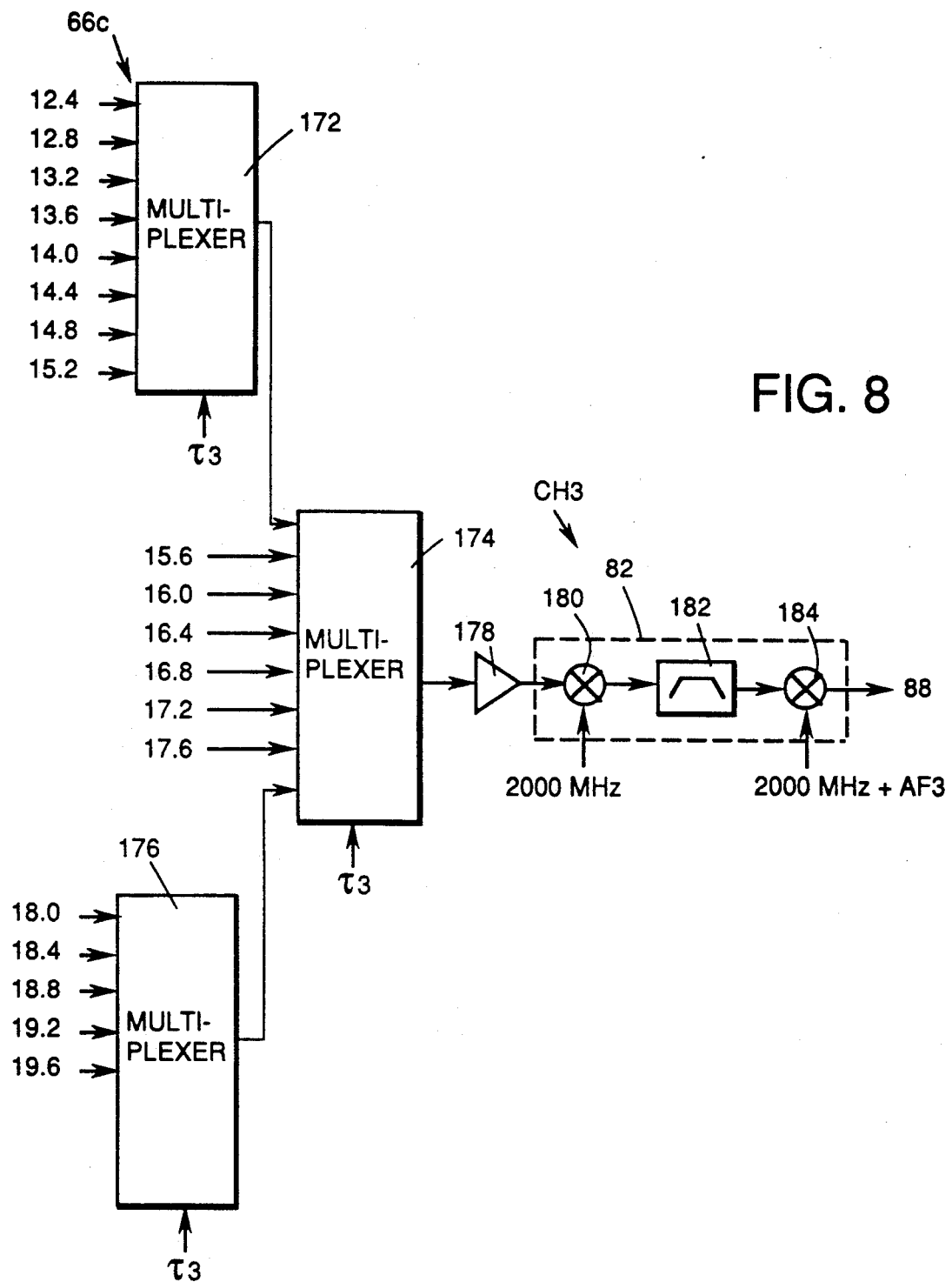

As illustrated in FIG. 8, the delay element 66c includes eight-input multiplexers 172, 174 and 176 having inputs connected to the outputs of the delay elements 128 and 130 as shown. The multiplexers 172, 174 and 176 are cascaded as described above to provide more than eight delay inputs. The output of the multiplexer 174 is connected through an amplifier 178 to the frequency shifting unit 82, which includes a first mixer 180, bandpass filter 182 and second mixer 184 which shift the center frequency of the pulses propagating through the fourth channel CH3 by $\Delta$F3 in the same manner as described above for the second channel CH1.

Figure 9:
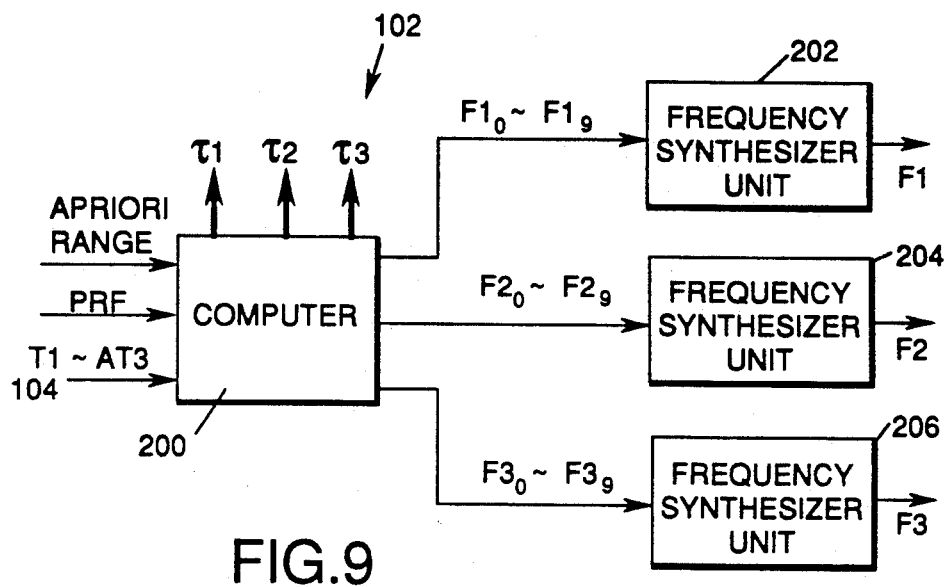
FIG. 9 is a block diagram illustrating a controller unit of the invention.

The controller unit 102 is illustrated in FIG. 9 as including a digital computer 200 which receives the time periods $\Delta T1$ to $\Delta T3$ from the timer unit 104, in addition to the current values of PRF and apriori range from appropriate components (not shown) of the radar system 60, and generates the control signals for setting the time delays $\tau_1$ to $\tau_3$ of the delay elements 66a to 66c of the delay line 66. The computer 200 also generates and feeds nine control signals $F1_0$ to $F1_9$ to a frequency synthesizer unit 202, control nine signals $F2_0$ to $F2_9$ to a frequency synthesizer unit 204 and nine control signals $F3_0$ to $F3_9$ to a frequency synthesizer unit 206.

The frequency synthesizer units 202, 204 and 206 are identical, and generate the differential frequency signals $\Delta$F1 to $\Delta$F3 which are fed to the frequency shifting units 4, 86 and 88 respectively. For simplicity of description, the constant 2,000 MHz signals which are added to the differential frequency signals $\Delta$F1 to $\Delta$F3 will be disregarded.

Figure 10:
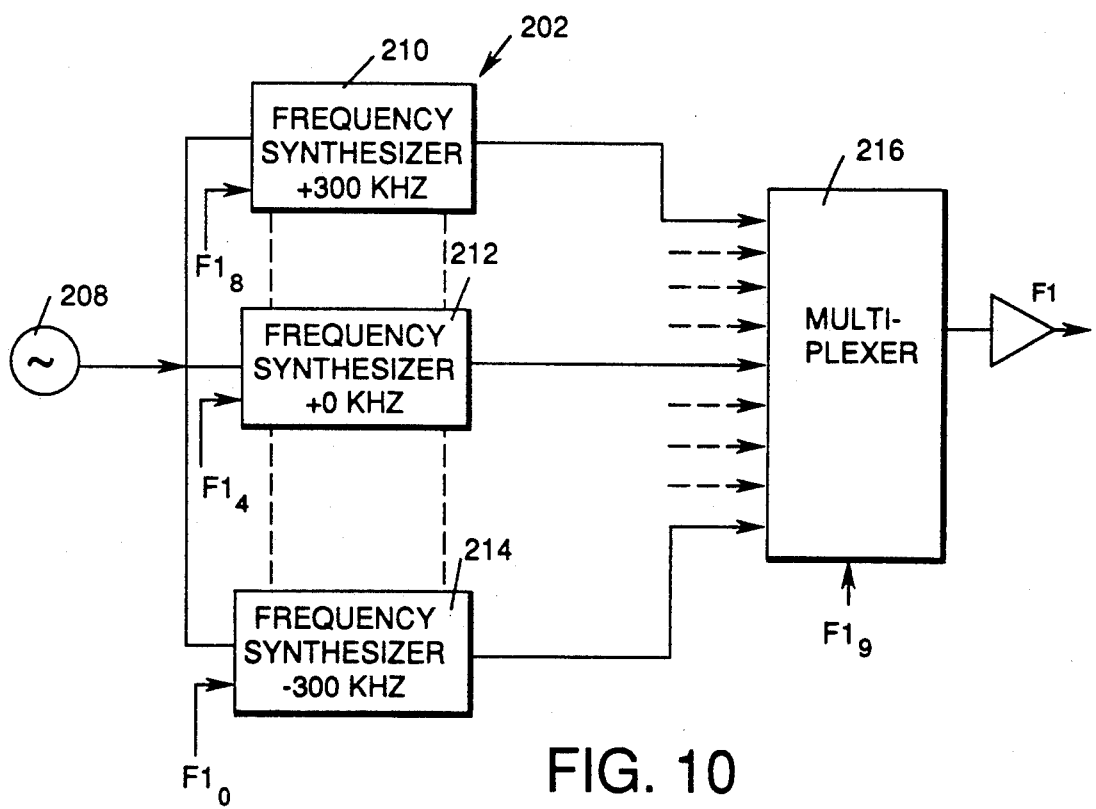
FIG. 10 is a schematic diagram illustrating a frequency synthesizer assembly of one of the frequency shifting units.

The frequency synthesizer unit 202 is illustrated in FIG. 10, and includes a reference frequency generator 208 which generates and feeds a reference frequency to nine frequency synthesizers. Only three of the nine frequency synthesizers are shown in the drawing, and designated as 210, 212 and 214, with the control signals $F1_0$, $F1_4$ and $F1_8$ being applied thereto respectively. The signals $F1_1$ to $F1_3$ are applied to three synthesizers intermediate between the synthesizers 214 and 212, whereas the signals $F1_5$ to $F1_7$ are applied to three synthesizers which are intermediate between the synthesizers 212 and 210. The nine frequency synthesizers are identical, have outputs connected to inputs of a multiplexer 216 and, and although not shown in detail, may be constituted by conventional phase-lock loop units.

Upon setting of the PRF, the computer 200 generates the signal $F1_4$ to control the center synthesizer to generate an output signal at the value of $\Delta F1$ corresponding to the PRF. The computer 20 generates the signal $F1_8$ to control the synthesizer 210 to generate an output signal at a frequency of ($\Delta F1 + 300$ KHz), and the signal $F1_0$ to control the synthesizer 214 to generate an output signal at a frequency of ($\Delta F1 - 300$ KHz). The intermediate synthesizers are controlled by the respective control signals to generate signals at frequencies which differ from each other by 75 KHz. Thus, the synthesizers generate output frequencies in increments of 75 KHz within a range of 300 KHz above and below $\Delta F1$. This range is selected to accommodate the range of anticipated interpulse jitter in the radar system 60, and may be larger or smaller depending on a particular application.

Currently available synthesizers are capable of continuous frequency variation, but are not capable of variation quickly enough to accommodate interpulse jitter in a practical pulse compression radar system. However, currently available multiplexers are capable of being switched at this speed. After the synthesizers 210 to 214 are set to their incremental frequencies centered on $\Delta F1$ at the time of setting the radar PRF, the computer 200 feeds a control signal $F1_9$ to the multiplexer 216 to change the value of $\Delta F1$ to compensate for the measured differences in the time periods $\Delta T1$ to $\Delta T3$ caused by interpulse jitter. If, for example, the new required value of $\Delta F1$ is 150 KHz above the initial value, the signal $F1_9$ is set to control the multiplexer 216 to select the input connected to the synthesizer (not shown) which receives the control signal $F1_6$ to generate an output signal two increments of 75 KHz above the initial value of $\Delta F1$.

Figure 11:
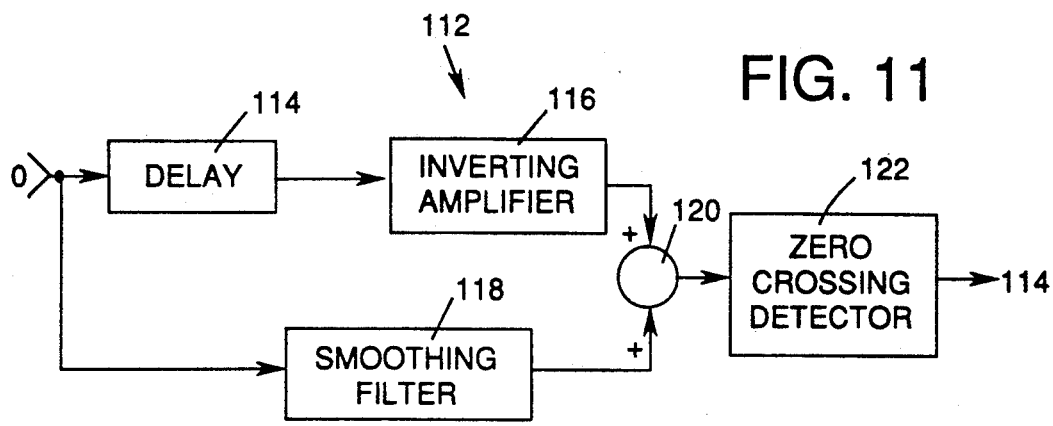
FIG. 11 is a block diagram illustrating a constant fraction discriminator unit of the invention.

The constant fraction discriminator 112 is illustrated in FIG. 11, and has a first channel which includes a delay element 114 and inverting amplifier 116, and a second channel which includes a smoothing filter 118. The outputs of the amplifier 116 and filter 118 are applied to inputs of an adder 120, the output of which is applied to a zero crossing detector 122.

The constant fraction discriminator 12 determines the arrival time of a pulse by generating an output when the pulse edge reaches a fixed fraction of its maximum amplitude. The pulses from the low pass filter 110 are delayed by the element 114 for a time period greater than the pulse rise time, and inverted and amplified in the amplifier 116 by a gain factor which is the reciprocal of the fixed fraction. The adder 120 produces a zero output when the magnitude of the output of the amplifier 116 exceeds that of the filter 118, and the detector 122 produces an output pulse at this time.

The constant fraction discriminator 112 is desirable because it has greater dynamic range than other types of discriminators such as level adjusters. However, other types of discriminators and apparatus for determining the time periods $\Delta T1$ to $\Delta T3$ may be employed within the scope of the present invention.

Although not shown in detail, the counter 114 generates clock pulses at a frequency which is much higher than the PRF, and counts the number of clock pulses between successive output pulses from the detector 122. The corresponding time period $\Delta T1$ to $\Delta T3$ is equal to the counted number of clock pulses multiplied by the period between the clock pulses.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

I claim:

1. A post detection integration apparatus for pulse compression radar, comprising:
   first surface acoustic wave (SAW) matched filter means for compressing received expanded radar pulses having a normal center frequency to produce first compressed pulses;
   first envelope detector means for demodulating said first compressed pulses to produce first demodulated pulses;
   delay means for delaying said received pulses by a variable time delay to produce delayed pulses;
   frequency shifting means for shifting the center frequency of said delayed pulses from said normal center frequency by a variable differential frequency to produce frequency shifted pulses;
   second SAW matched filter means for compressing said shifted pulses to produce second compressed pulses;
   second envelope detector means for demodulating said second compressed pulses to produce second demodulated pulses;
   integrator means for summing said first demodulated pulses and said second demodulated pulses to produce integrated output pulses;
   the first and second matched filter means variably delaying said received pulses and said shifted pulses as a predetermined function of said normal center frequency and said differential frequency respectively;
   sensor means for determining the time period between successive received pulses; and
   controller means for controllably setting said time delay of the delay means and said differential frequency of the frequency shifting means as a predetermined function of said time period such that the second demodulated pulses are delayed relative to said first demodulated pulses by substantially said time period.

2. An apparatus as in claim 1, in further comprising SAW weighted filter means disposed upstream of the first matched filter means and the delay means for suppressing sidelobes of said received pulses.

3. An apparatus as in claim 2, in which:
   the frequency shifting means is constructed to shift said center frequency of said delayed pulses within a range which extends above and below said normal center frequency by first and second predetermined maximum differential frequencies respectively;
   the matched filter means has a first predetermined passband which corresponds to a bandwidth of said received pulses and excludes said sidelobes; and
   the second matched filter means has a second predetermined passband which extends above and below said first passband by approximately said first and second maximum differential frequencies respectively.

4. An apparatus as in claim 1, in which the delay means comprises a SAW delay element.

5. An apparatus as in claim 1, in which the sensor means is constructed to sense the length of time between successive transmitted expanded radar pulses which correspond to said received pulses and determine said time period as being equal thereto.

6. An apparatus as in claim 5, in which the sensor means comprises:
   discriminator means for sensing arrival times of said successive transmitted pulses; and
   timer means for measuring the length of time between said arrival times and determining said time period as being equal thereto.

7. An apparatus as in claim 6, in which the discriminator means comprises a constant fraction discriminator.

8. An apparatus as in claim 1, in which the delay means comprises:
   a SAW tapped delay line having a plurality of taps; and
   multiplexer means having inputs connected to the taps of the delay line respectively and an output;
   the controller means controlling the multiplexer means to connect a selected input to said output thereof in accordance with said predetermined function of said time period.

9. An apparatus as in claim 1, in which the frequency shifting means comprises:
   a plurality of variable frequency synthesizer means for producing signals at frequencies which differ from each other by predetermined increments;
   multiplexer means for producing a differential signal at said differential frequency at an output thereof, the multiplexer means having inputs connected to outputs of the synthesizer means respectively; and
   mixer means for mixing said differential signal with said delayed pulses to produce said shifted pulses;
   the controller means controlling the multiplexer means to connect a selected input to said output thereof in accordance with said predetermined function of said time period.

10. An apparatus as in claim 1, in which:
    the delay means is constructed to vary said time delay in first time increments; and
    the frequency shifting means is constructed to vary said differential frequency in frequency increments such that the second filter means delays said shifted pulses in second time increments which correspond to said frequency increments and are smaller than said first time increments.

11. A method of compressing and integrating received expanded radar pulses having a normal center frequency, comprising the steps of:
    (a) determining a time period between successive received pulses;
    (b) compressing said received pulses to produce first compressed pulses;
    (c) delaying said received pulses by a variable time delay to produce delayed pulses;
    (d) shifting the center frequency of said delayed pulses from said normal center frequency by a variable differential frequency to produce frequency shifted pulses;
    (e) compressing said shifted pulses using a surface acoustic wave (SAW) matched filter means which variably delays said shifted pulses as a predetermined function of said differential frequency to produce second compressed pulses;
    (f) demodulating said first compressed pulses to produce first demodulated pulses;
    (g) demodulating said second compressed pulses to produce second demodulated pulses;
    (h) summing said first demodulated pulses and said second demodulated pulses to produce integrated output pulses; and
    (i) prior to performing steps (b) and (c), setting said time delay and said differential frequency as a predetermined function of said time period such that the second demodulated pulses are delayed relative to said first demodulated pulses by substantially said time period.

12. A method as in claim 11, further comprising the step, performed prior to step (b) of:
    (j) suppressing sidelobes of said received pulses.

13. A method as in claim 11, in which step (a) comprises sensing a length of time between successive transmitted expanded radar pulses which correspond to said received pulses and determining said time period as being equal thereto.

* * * * *